(12) United States Patent
Shimizu

(10) Patent No.: US 7,317,477 B2
(45) Date of Patent: Jan. 8, 2008

(54) IMAGE PICKUP APPARATUS FOR PROCESSING AN IMAGE SIGNAL BY USING MEMORY

(75) Inventor: Tetsuya Shimizu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1144 days.

(21) Appl. No.: 10/000,087

(22) Filed: Dec. 4, 2001

(65) Prior Publication Data

US 2002/0081104 A1   Jun. 27, 2002

(30) Foreign Application Priority Data

Dec. 8, 2000   (JP) ............................. 2000-374233

(51) Int. Cl.
*H04N 5/225*  (2006.01)
*H04N 5/228*  (2006.01)
*H04N 5/76*   (2006.01)

(52) U.S. Cl. .............................. 348/220.1; 348/222.1; 348/231.99

(58) Field of Classification Search ............. 348/220.1, 348/222.1, 279, 273, 231.99
See application file for complete search history.

(56) References Cited

U.S. PATENT DOCUMENTS

| | | | |
|---|---|---|---|
| 5,262,871 A * | 11/1993 | Wilder et al. ............... | 348/307 |
| 5,737,014 A * | 4/1998 | Tojo et al. ................ | 348/220.1 |
| 5,805,618 A | 9/1998 | Shimizu ................... | 371/40.16 |
| 6,085,348 A | 7/2000 | Shimizu ..................... | 714/755 |
| 6,603,866 B1 * | 8/2003 | Motono et al. ............. | 382/107 |
| 2002/0024602 A1 * | 2/2002 | Juen .......................... | 348/220 |
| 2004/0263645 A1 * | 12/2004 | Okada et al. .......... | 348/231.99 |

OTHER PUBLICATIONS

System on a Chip for Digital Still Camera; Okada et al; Aug. 1999; IEEE Transactions on Consumer Electronics, vol. 45, No. 3; pp. 584-590.*

* cited by examiner

*Primary Examiner*—Lin Ye
*Assistant Examiner*—Nicholas G Giles
(74) *Attorney, Agent, or Firm*—Fitzpatrick, Cella, Harper & Scinto

(57) ABSTRACT

An image pickup apparatus comprising: an image pickup unit for outputting an image signal having a first number of pixels which is greater than a predetermined number of pixels; a converting unit for converting the image signal having the first number of pixels, outputted from the image pickup unit into an image signal having the predetermined number of pixels; a first memory having storage capacity corresponding to the predetermined number of pixels, for storing the image signal having the predetermined number of pixels, outputted from the converting unit; a second memory having a storage capacity corresponding to the first number of pixels, for storing the image signal having the first number of pixels, outputted from the image pickup unit; and a still image processing unit for outputting as still image data the image signal having the first number of pixels, read out from the second memory.

8 Claims, 3 Drawing Sheets

| | | | | |
|---|---|---|---|---|
| N-th LINE | Cy | Ye | Cy | Ye |
| (N+1)-th LINE | Mg | G | Mg | G |
| (N+2)-th LINE | Cy | Ye | Cy | Ye |
| (N+3)-th LINE | G | Mg | G | Mg |

IMAGE PICKUP APPARATUS FOR PROCESSING AN IMAGE SIGNAL BY USING MEMORY

BACKGROUND OF THE INVENTION

1. Field of the Invention

The present invention relates to an image processing apparatus, and more particularly to an apparatus for processing image signals having different numbers of pixels by using memory.

2. Related Background Art

Conventionally, there is known a digital VTR which is integrated into a video camera for recording an image signal which has been captured by means of a video camera onto a magnetic tape as an image signal. Further, in recent years, a digital VTR has been developed which is equipped with a memory card slot, and which records moving image data onto a magnetic tape in a conventional manner, and which is also capable of recording a still image onto the memory card.

Meanwhile, due to the improvement of semiconductor technology in recent years, the number of pixels in CCDs has increased dramatically, and one can conceive of even a digital VTR employing a CCD that has more pixels than that of conventional, to capture and record a still image.

However, the conventional digital VTR is designed based on the premise that the moving image data and still image data are signals having exactly the same number of pixels. Therefore, when the number of pixels in the CCD is increased as mentioned above and the number of pixels in the still image data are also increased as a result thereof, it is then no longer possible to deal with the signals easily.

Further, in recent years, due to the stabilization of circuit properties and decrease in electrical power consumption, it has become normal to arrange a moving image processing circuit, a still image processing circuit and other various circuits including memory on the same integrated circuit.

However, when the number of pixels of the image signal is increased, memory having memory capacity corresponding to the number of pixels of the image data is necessary particularly for still image processing. However, when the memory for the still-image processing is also arranged onto the same integrated circuit, then it is not possible to add only the memory alone, or exchange the memory for another memory having larger capacity. Therefore, it was necessary to redesign the integrated circuit each time the number of pixels of the image signal is increased, and this involves significant labor and costs.

SUMMARY OF THE INVENTION

An object of the present invention is to solve the above-mentioned problem.

Other object of the present invention is to make it possible to process the moving image and still image data easily even in the case where the number of pixels of the image signal changes.

Still other object of the present invention is to make it possible to process the still image data easily, without having to alter the design of the integrated circuit even in the case where the number of pixels of the image signal changes.

In order to attain the above-mentioned objects, according to one aspect of the present invention, there is provided an image pickup apparatus comprising:

image pickup means for outputting an image signal having a first number of pixels which is greater than a predetermined number of pixels;

converting means for converting the image signal having the first number of pixels, outputted from the image pickup means, into an image signal having the predetermined number of pixels;

a first memory having storage capacity corresponding to the predetermined number of pixels, for storing the image signal having the predetermined number of pixels, outputted from the converting means;

a second memory having storage capacity corresponding to the first number of pixels, for storing the image signal having the first number of pixels, outputted from the image pickup means; and still image processing means for outputting as still image data the image signal having the first number of pixels, read out from the second memory.

Other objects, features, and advantages of the present invention will be apparent from the following description taken in conjunction with the accompanying drawings.

DETAILED DESCRIPTION OF THE PREFERRED EMBODIMENTS

Hereinafter, explanation will be made of an embodiment of the present invention with reference to the drawings.

Figure 1:
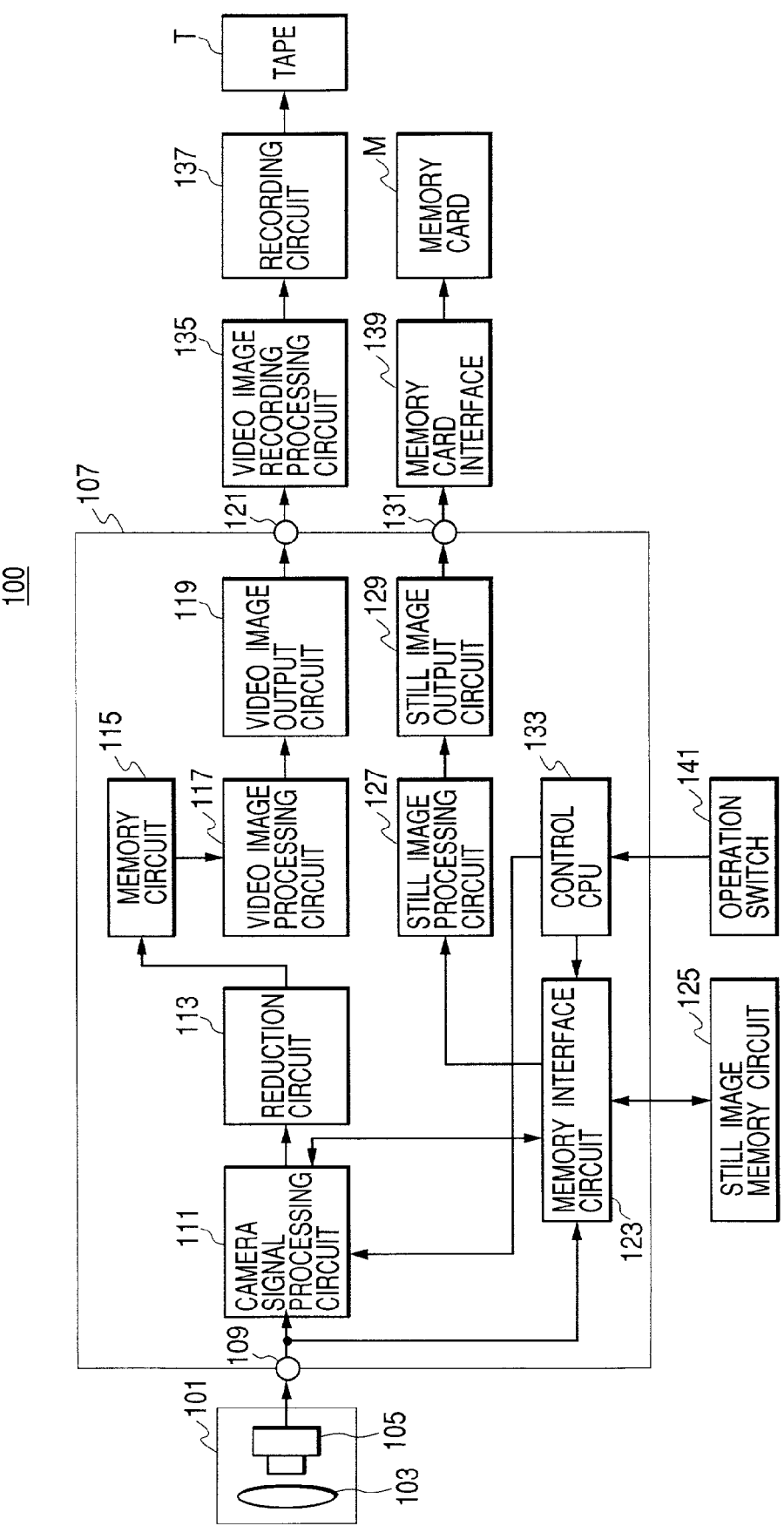
FIG. 1 is a diagram showing a construction of a VTR which is integrated into a camera to which the present invention is applied.

FIG. 1 is a block diagram showing a construction of a digital VTR 100 which is integrated into a camera to which the present invention is applied. The digital VTR of the present invention is provided with a card slot to which a memory card is mounted, and has a moving image mode for recording moving image data onto a magnetic tape, and a still image mode for recording still image data onto the memory card. Explanation will be made of operations in the moving image mode first.

Figures 2, 3:
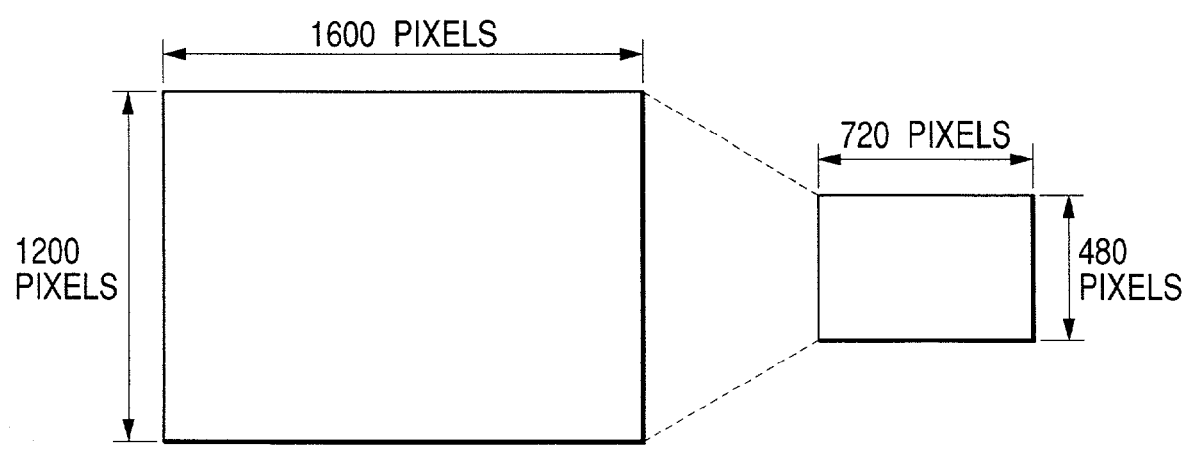
FIG. 2 is a diagram showing a filter construction of an image pickup device, used in an embodiment of the present invention.
FIG. 3 is a diagram showing a reduction processing.

In FIG. 1, reference numeral 101 is an image pickup circuit, which is comprised of an optical system 103 including a lens, a diaphragm and the like; and an image pickup element 105 including a CCD, a drive circuit and A/D converter therefor and the like. In the apparatus in FIG. 1, the image pickup device is a single CCD arranged with a general complimentary color filter, and the number of pixels of the CCD is approximately 2,000,000 pixels, and this outputs image data of a UXGA size having 1600 effective pixels horizontally and 1200 effective pixels vertically per single frame. According to the present embodiment, the color filters of the CCD is comprised of Cyan (Cy), Yellow (Y), Green (G) and Magenta (Mg), and is arranged as shown in FIG. 2.

When the image data is to be read out from the CCD, in the moving image mode, it is generally the case that the pixels of two adjacent lines are added and read out the addition result. The read-out operation performed by the image pickup circuit 101 is controlled by means of a control circuit which is not shown in the diagram, and when the moving image recording mode is set by means of an operation switch 141, the image signal is read out as described below.

For example, in the case of the array shown in FIG. 2, the image signal from a first field in the image data of one frame is read out in the following order: N-th line+(N+1)-th line, and then (N+2)-th line+(N+3)-th line. The image signal from a second field is read out in the order of: (N+1)-th line+(N+2)-th line, and then (N+3)-th line+(N+4)-th line.

The digital image signal outputted from the image pickup circuit 101 is outputted through an input terminal 109 to a camera signal processing circuit 111. The camera signal processing circuit 111 performs clamp processing on the image data outputted through the input terminal 109, white balance processing, and then color separation processing. Additionally, after outline-correction processing and γ-correction processing are performed, a matrix circuit converts the image data into a luminance signal Y and color difference signals Cr and Cb, and in the moving image mode, the converted image signal is outputted to a reduction circuit 113.

The reduction circuit 113 uses an LPF to place a band restriction two-dimensionally in vertical direction and horizontal directions of the image signal outputted from the camera signal processing circuit 111. Then, the image signal subjected to the band restriction is sub-sampled with a sampling structure conforming to the ITU-R601 standard, which produces the result that the number of pixels of the one frame of the image signal outputted from the camera signal processing circuit 111 is converted into a predetermined number of pixels according to a determined format for recording onto a tape T, such as 720 horizontal pixels by 480 vertical pixels in the case of the present embodiment as shown in FIG. 3, and thereby reducing the size.

The image signal processed by the reduction circuit 113 is written to a memory circuit 115. The memory circuit 115 has sufficient capacity to store an image signal having the above-mentioned predetermined number of pixels equivalent to the number of pixels in one frame, such as 720 by 480 pixels, as a base band signal, which is to say that the image signal has not been treated with compression or encoding processing.

The image signal recorded in the memory circuit 115 is read out by a video image processing circuit 117 synchronizingly with the timing to which the signal is supposed to be outputted. The video image processing circuit 117 performs known composition processing and special effect processing such as electronic zooming processing, wipe, or fade on the image signal read out from the memory circuit 115, and then it outputs the image signal to a video image output circuit 119. The video image output circuit 119 adds a horizontal and vertical synchronization signal to the image signal from the video image processing circuit 117, converts the image signal into an ITU-R601/R656-conforming digital video image signal, and outputs it through an output terminal 121 to a video image recording processing circuit 135.

The video image recording processing circuit 135 performs known block encoding processing on the digital image signal outputted through the output terminal 121, and thus compresses an amount of its information. Then, the compressed and encoded image data is subjected to addition of synchronization data and ID data, or is subjected to error correction encoding or other such processing, thereby generating an array of data to be recorded and outputting it to a recording circuit 137. The recording circuit 137 performs processing such as digital modulation on the array of data to be recorded which has been outputted from the video image recording processing circuit 135, and forms a great number of tracks onto the tape T by means of a revolving head, thereby recording the data array.

Next, explanation will now be made of the still image mode. The still image mode is a mode for extracting one frame from an image signal outputted from the image pickup circuit 101 in response to the operation of the shutter button of an operation switch 141 for recording the still image, and recording the extracted frame onto a memory card M as the still image data.

When a still image recording switch of the operation switch 141 is operated, the image pickup circuit 101 reads out from the CCD in a non-additional fashion the image signal of one frame according to the operation timing of the still image recording switch, and outputs the image signal of this one frame to the input terminal 109.

In other words, when the still image recording switch is in a state of not being operated, the image pickup circuit 101 reads out the image signal in the additional fashion as described above, and outputs the image signal to a monitor not shown in the diagram. Therefore, while in a state of waiting to record the still image, it is possible for a user to confirm the standard moving image data by means of the monitor. Then, when the user operates the still image recording switch, the image pickup circuit 101 reads out the image signal of the one frame in the non-additional fashion according to the operation timing of the switch.

For example, in the case of the filter array shown in FIG. 2, in the non-additional read-out, the image signal of the first field is read out in the order of N-th line and then (N+2)-th line, and the image signal of the second field is read out in the order of (N+1)-th line and then (N+3)-th line, whereby the image signal is read out without the pixels of adjacent lines being added to each other.

The image signal of the one frame, which has thus been inputted from the input terminal 109, is outputted to a memory interface circuit 123 once and then recorded to a still image memory circuit 125.

The memory interface circuit 123 is controlled by a control CPU 133 which receives an instruction from the operation switch 141, and the circuit 123 writes and reads out the image data to and from the still image memory circuit 125. The still image memory circuit 125 has sufficient capacity to store uncompressed image data of the one frame having a number of pixels equivalent to the number of effective pixels in the CCD of the image pickup circuit 101.

Further, in the present embodiment, a versatile SDRAM (Synchronous Dynamic RAM) is used for the still image memory circuit. Therefore, the memory interface circuit 123 follows a standard of the versatile SDRAM, which is used as the still image memory circuit 125, to packet the image data from the input terminal 109, attach a command to the packets and accesses the still image memory circuit 125. Additionally, in order to enable extension of the memory, a sufficient number of address to be generated by the memory interface circuit 123 for the versatile SDRAM are secured. Further, in the present embodiment, it is possible to use a versatile SDRAM having storage capacity of more than 64 megabits for the still image memory circuit 125, for example.

The image data of the one frame, which was written into the still image memory circuit 125, is read out by being scanned sequentially (i.e., non-interlaced scan) by the memory interface circuit 123, and is outputted to the camera signal processing circuit 111.

As in the moving image mode, the camera signal processing circuit 111 performs clamp processing, white-balance processing and then color separation processing on the image signal outputted from the memory interface circuit 123, and further, after the outline-correction processing and the γ-correction processing, a matrix circuit converts the image signal into a luminance signal Y and a color difference signals Cr and Cb. After the image signal of the one frame has been processed by the camera signal processing circuit 111, it is outputted again to the memory interface circuit 123 and stored into the still image memory circuit 125.

After the image signal of the one frame is converted into the luminance signal and the color difference signal and written to the still image memory circuit 125, then it is read out by the memory interface circuit 123 in a sequence which is appropriate for processing by a still image processing circuit 127 and outputted to the still image processing circuit 127.

The still image processing circuit 127 follows the JPEG standard to encode the image signal outputted from the memory interface circuit 123, and outputs the image signal to the still image output circuit 129 as still image data. The still image output circuit 129 converts the still image data from the still image processing circuit 127 into data of a format conforming to a file format used by a memory card interface 139, and outputs the still image data through the output terminal 131 to the memory card interface 139. The memory card interface 139 designates a write address on the memory card M and records onto the memory card M as one file the encoded still image data of the one frame, which was outputted from the output terminal 131. The memory card M is constructed detachably to the VTR 100 through the memory card slot provided to the VTR 100.

Here, in FIG. 1, the camera signal processing circuit 111, the reduction circuit 113, the memory circuit 115, the video image processing circuit 117, the video image output circuit 119, the memory interface circuit 123, the still image processing circuit 127, the still image output circuit 129 and the control CPU 133 are built on the same integrated circuit 107. Meanwhile, the still image memory circuit 125 is built as a separate circuit from the integrated circuit 107.

In other words, in the present embodiment the bulk of the circuits relating to the moving image processing and the still image processing are placed on the same integrated circuit 107, which can attain equalization of the characteristics of the circuits and suppression of electrical power consumption. Also, among the circuits relating to the moving image processing and the still image processing, if the still image memory circuit 125 is formed as a separate circuit from the integrated circuit 107, and this produces the result that operations may be carried out easily even when the number of pixels of the CCD used for the image pickup circuit 101 is great.

That is, even in the case where the number of pixels of the CCD used for the image pickup circuit 101 becomes greater, the reduction processing performed by the reduction circuit 113 is modified according to the size of the image signal from the image pickup circuit 101, and a still image memory 125 is provided with, for example a plurality of 128-megabit versatile SDRAMs or 64-megabit versatile SDRAMs or the like having capacity corresponding to the size of the image signal from the image pickup circuit 101, thereby becoming it possible for operations to be carried out easily.

Further, regarding the memory 115 for processing the moving image, the number of pixels of the image signal handled in the moving image processing is a predetermined number determined according to the format to be used for recording onto the tape T, which is fixed at 720 pixels by 480 pixels. Therefore, even if the number of pixels of the CCD is changed, there is no need to change the capacity of the memory circuit 115 in response to the change in the number of CCD pixels.

Considering the fact that the number of pixels of the image signal may be increased as mentioned above, it is desirable to secure in advance sufficient addresses which are to be generated at the memory interface circuit 123, as mentioned above.

Further, considering a function for consecutive image capturing, for the memory capacity of the still image memory circuit 125, a memory having sufficient capacity for several frames may be used.

Next, explanation will be made of Embodiment 2 of the present invention.

In the apparatus of FIG. 1, the memory circuit 115 for the processing of the moving image is arranged on the integrated circuit 107; however, it is also possible to use a versatile SDRAM and construct the memory circuit 115 as a separate circuit like the still image memory circuit 125.

Figure 4:
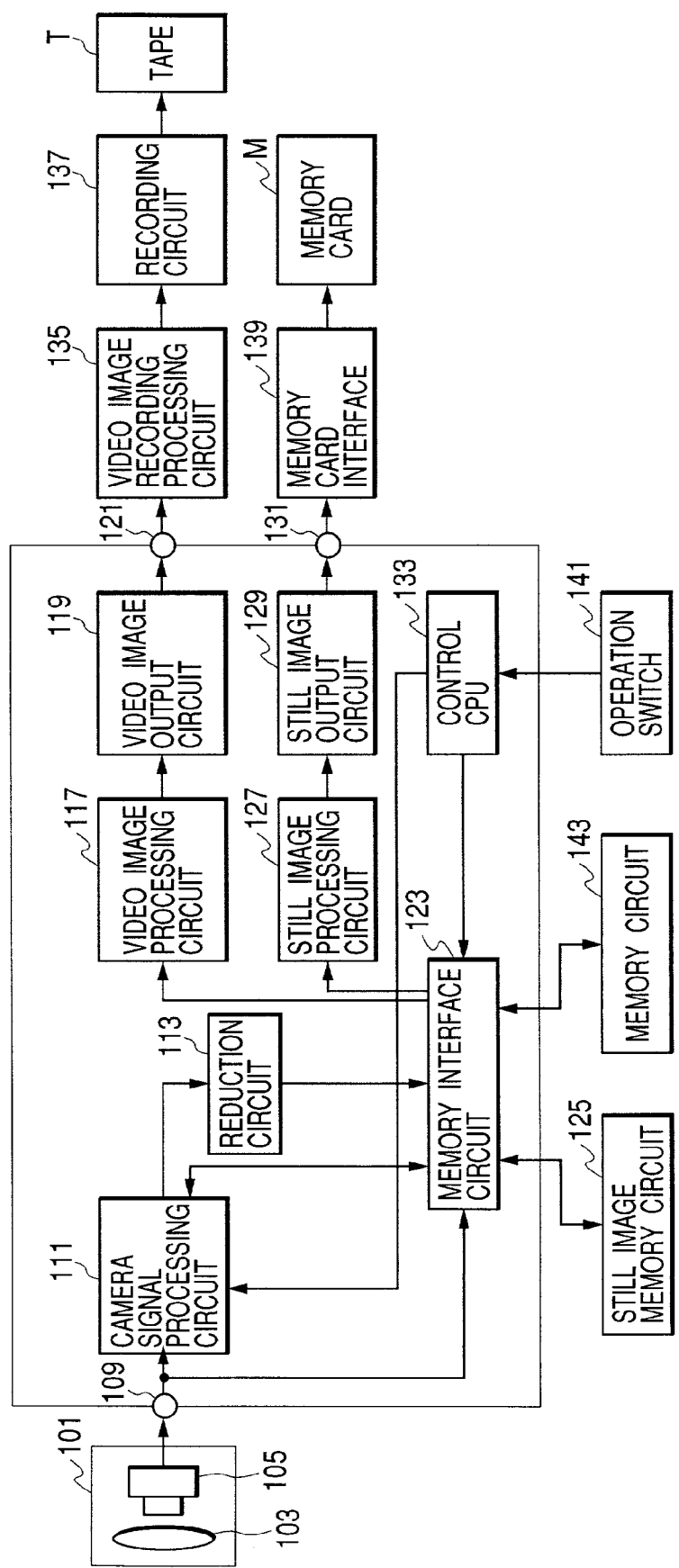
FIG. 4 is a diagram showing another construction of the VTR integrated into the camera.

FIG. 4 is a diagram showing a construction of a VTR 100 which is integrated into a camera, in the case where the versatile SDRAM is also used for the memory circuit for processing the moving image. In FIG. 4, the same reference numeral are used for constructions which are the same as those in FIG. 1, and explanations thereof will be omitted.

In FIG. 4, in the moving image mode, the image signal reduced by the reduction circuit 113 is outputted to the memory interface circuit 123. The memory interface circuit 123 generates the write address in response to the control signal from the control CPU 133, and writes to the memory circuit 143 the image signal outputted from the reduction circuit 113. Then the memory interface circuit 123 reads out the image signal from the memory circuit 143 in synchronism with a predetermined output timing, and outputs the image signal to the video image processing circuit 117.

Also, operations in the still image mode are similar to those of the apparatus of FIG. 1.

In the present embodiment, the versatile SDRAM is used for the memory circuit 143, whereby ease of use is improved further.

That is, in the case where the number of pixels of the CCD which is used for the image pickup circuit 101 exceeds 360,000 pixels, then a 32-megabit versatile SDRAM is used for the memory circuit 143 and the storage region of the memory circuit 143 is divided into a moving image processing region and a still image processing region, whereby it becomes possible to achieve the moving image data processing and the still image data processing without specially having to provide a still image memory circuit 125.

On the other hand, in the case where the number of pixels of the CCD increases, the processing of the still image data, which has more pixels than the moving image data, is made possible by newly adding a still image memory circuit 125 in addition to the memory circuit 143.

In this way, by using the shared versatile SDRAM interface for the memory circuit 143 for the moving image processing and the memory interface of the still image memory circuit 125, it thus becomes possible to process image signals ranging from an image signal having 360,000 pixels to an image signal having a great number of pixels such as more than 1,000,000 pixels, without making considerable changes to the design of the circuit.

Note that, in the above-mentioned embodiments, the versatile SDRAM is used for the still image memory circuit 125; however, it is also possible, of course, to use a memory other than this.

As mentioned above, according to the respective embodiments of the present invention, even in the case where the number of pixels of the image signal changes, it is still possible to process the moving image and still image data easily. Further, even in the case where the number of pixels of the captured image signal changes, it is still possible to process the still image data easily, without having to alter the design of the integrated circuit.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus comprising: image pickup means for outputting an image signal having a first number of pixels which is greater than a predetermined number of pixels; converting means for converting a moving image signal having the first number of pixels, outputted from said image pickup means, into an image signal having the predetermined number of pixels; a first memory having storage capacity corresponding to the predetermined number of pixels, for storing the moving image signal having the predetermined number of pixels, outputted from said converting means; a second memory having storage capacity corresponding to the first number of pixels; a memory interface arranged to generate addresses of said second memory, to write into said second memory a still image signal of the first number of pixels outputted from said image pickup means, and to read out a still image signal of the first number of pixels from said second memory, said memory interface being capable of generating addresses of a memory of larger capacity, corresponding to a number of pixels greater than the first number of pixels, than said second memory; still image processing means for processing the still image signal having the first number of pixels, read out by said memory interface; and first recording means for recording the moving image signal read out from said first memory on a first recording medium in accordance with a predetermined recording format, wherein the predetermined number of pixels conforms to the predetermined recording format, and wherein said converting means, said first memory, said memory interface, and said still image processing means are provided on a single integrated circuit, and said image pickup means and said second memory are not provided on said single integrated circuit.

2. An apparatus according to claim 1, further comprising special effect means for performing a special effect processing on the image signal having the predetermined number of pixels, stored in said first memory, and outputting the thus-processed image signal, wherein said special effect means is provided on said single integrated circuit.

3. An apparatus according to claim 1, further comprising output means for converting the image signal having the predetermined number of pixels, stored in said first memory, into a predetermined format and outputting the thus-converted image signal, wherein said output means is provided on said single integrated circuit.

4. An apparatus according to claim 1, wherein said still image processing means includes encoding means for encoding the still image signal read out from said second memory and compressing an amount of the still image signal.

5. An apparatus according to claim 1, wherein said still image pickup apparatus includes a moving image processing mode and a still image processing mode, wherein in the moving image processing mode, said image pickup means adds together signals of pixels of vertically-adjacent lines of image pickup elements and reads out the added signals, and in the still image processing mode, said image pickup means reads out the signal of each line of the image pickup elements independently.

6. An apparatus according to claim 1, further comprising: second recording means for recording the still image signal outputted from said still image processing means, wherein said first recording means records the moving image signal on the first recording medium and said second recording means records the still image signal on a second recording medium different from the first recording medium.

7. An apparatus according to claim 6, wherein the first recording medium is a magnetic tape, and the second recording medium is a memory card.

8. An image processing apparatus comprising:

an input unit arranged to input an image signal having a first number of pixels which is greater than a predetermined number of pixels, said input unit being capable of inputting image signals of different number of pixels;

a conversion circuit arranged to convert a moving image signal having the first number of pixels, inputted from said input unit, into an image signal having the predetermined number of pixels;

a first memory having storage capacity sufficient for the predetermined number of pixels, arranged to store the moving image signal having the predetermined number of pixels, outputted from said conversion circuit;

a second memory having a storage capacity corresponding to the first number of pixels;

a memory interface arranged to generate addresses of said second memory, to write into said second memory a still image signal having the first number of pixels, outputted from said input unit, and to read out from said second memory a still image signal having the first number of pixels, said memory interface being capable of generating addresses of a memory of larger capacity, corresponding to a number of pixels greater than the first number of pixels, than said second memory; and a still image processing circuit arranged to process the still image signal having the first number of pixels, read out by said memory interface; and a recording unit arranged to record the moving image signal read out from said first memory on a recording medium in accordance with a predetermined recording format, wherein the predetermined number of pixels conforms to the predetermined recording format, and wherein said input unit, said conversion circuit, said first memory, said memory interface, and said still image processing circuit are provided on a single integrated circuit, and said second memory is not provided on said integrated circuit.

* * * * *

UNITED STATES PATENT AND TRADEMARK OFFICE
CERTIFICATE OF CORRECTION

PATENT NO. : 7,317,477 B2  
APPLICATION NO. : 10/000087  
DATED : January 8, 2008  
INVENTOR(S) : Tetsuya Shimizu Page 1 of 1

It is certified that error appears in the above-identified patent and that said Letters Patent is hereby corrected as shown below:

COLUMN 1  
Line 56, "Other" should read --Another--.  
Line 60, "other" should read --another--.

COLUMN 2  
Line 56, "complimentary" should read --complementary--.

COLUMN 4  
Line 57, "address" should read --addresses--.

COLUMN 5  
Line 7, "and a" should read --and--.

COLUMN 6  
Line 27, "numeral" should read --numerals--.

COLUMN 8  
Line 4, "still" should be deleted.

Signed and Sealed this

Thirtieth Day of December, 2008

JON W. DUDAS  
*Director of the United States Patent and Trademark Office*